US00RE49796E

(19) United States
(12) Reissued Patent
Kim

(10) Patent Number: US RE49,796 E
(45) Date of Reissued Patent: *Jan. 9, 2024

(54) SYSTEM AND METHOD FOR PROVIDING A SCREEN SWITCHING SERVICE DURING CALL COUNSELING AND DEVICE APPLIED THERETO

(71) Applicant: CALLGATE CO., LTD., Seoul (KR)

(72) Inventor: Yong Jin Kim, Seoul (KR)

(73) Assignee: CALLGATE CO., LTD., Seoul (KR)

( * ) Notice: This patent is subject to a terminal disclaimer.

(21) Appl. No.: 17/742,763

(22) Filed: May 12, 2022

Related U.S. Patent Documents

Reissue of:
(64) Patent No.: 8,825,023
Issued: Sep. 2, 2014
Appl. No.: 13/696,508
PCT Filed: Jan. 12, 2011
PCT No.: PCT/KR2011/000229
§ 371 (c)(1),
(2) Date: Nov. 6, 2012
PCT Pub. No.: WO2012/096418
PCT Pub. Date: Jul. 19, 2012

U.S. Applications:
(63) Continuation of application No. 17/742,055, filed on May 11, 2022, which is an application for the reissue
(Continued)

(51) Int. Cl.
*H04W 88/02* (2009.01)
*H04N 7/14* (2006.01)
(Continued)

(52) U.S. Cl.
CPC ..... *H04N 7/147* (2013.01); *H04L 65/1083* (2013.01); *H04M 3/00* (2013.01);
(Continued)

(58) Field of Classification Search
CPC .... H04N 7/147; H04N 21/00; H04L 65/1083; H04L 65/1094; H04M 7/0027; H04M 3/00; H04M 3/5183; H04W 4/16
See application file for complete search history.

(56) References Cited

U.S. PATENT DOCUMENTS 8,477,766 B2 * 7/2013 Kwon ..... 370/353
2004/0243454 A1 * 12/2004 Yoshida ..... 705/7
2007/0123243 A1 * 5/2007 Suito ..... 455/419

FOREIGN PATENT DOCUMENTS

JP 2001-159944 6/2001
JP 2001-159944 A 6/2001
(Continued)

OTHER PUBLICATIONS

International Search Report for International Patent Application No. PCT/KR2011/000229, dated Sep. 23, 2011.

*Primary Examiner* — Minh Dieu Nguyen
(74) *Attorney, Agent, or Firm* — K&L Gates LLP

(57) ABSTRACT

The present invention relates to a system and method for providing a screen switching service during call counseling and a device applied thereto. According to the system for providing a screen switching service during call counseling, after a counselor displays a predetermined counseling material screen on a terminal of a caller in the event that the caller requests a call to the counselor in a customer service center in order to have a consultation, the consultation is provided with a voice call while the counseling material screen, being displayed on the terminal of the caller, is switched according to a page control of the remotely-located counselor.

26 Claims, 6 Drawing Sheets

Related U.S. Application Data of Pat. No. 8,825,023, filed as application No. PCT/KR2011/000229 on Jan. 12, 2011.

(51) Int. Cl.

| | |
|---|---|
| ***H04L 65/1083*** | (2022.01) |
| ***H04M 3/00*** | (2006.01) |
| ***H04M 3/51*** | (2006.01) |
| ***H04M 7/00*** | (2006.01) |
| ***H04N 21/00*** | (2011.01) |
| *H04W 4/16* | (2009.01) |

(52) U.S. Cl.

CPC ..... *H04M 3/5183* (2013.01); *H04M 7/0027* (2013.01); *H04N 21/00* (2013.01); *H04W 4/16* (2013.01)

(56) References Cited

FOREIGN PATENT DOCUMENTS

| | | | |
|---|---|---|---|
| JP | 2003-264636 | | 9/2003 |
| JP | 2003-264636 | A | 9/2003 |
| KR | 10-2002-0003631 | | 1/2002 |
| KR | 10-2002-0003631 | A | 1/2002 |
| KR | 10-2005-0112836 | | 12/2005 |
| KR | 10-2005-0112836 | A | 12/2005 |
| KR | 10-2009-0099924 | | 9/2009 |
| KR | 10-2009-0099924 | A | 9/2009 |

* cited by examiner

SYSTEM AND METHOD FOR PROVIDING A SCREEN SWITCHING SERVICE DURING CALL COUNSELING AND DEVICE APPLIED THERETO

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

*CROSS-REFERENCE TO RELATED APPLICATIONS*

*More than one reissue application has been filed for the reissue of U.S. Pat. No. 8,825,023. This patent application is a continuation reissue application of application Ser. No. 17/742,055 filed May 11, 2022, which is a reissue application of U.S. Pat. No. 8,825,023 issued from U.S. patent application Ser. No. 13/696,508, filed Nov. 6, 2012, which is the national phase application of International Application PCT/KR2011/000229, filed Jan. 12, 2011, each of which is hereby incorporated by reference in its entirety.*

TECHNICAL FIELD

The present disclosure relates to technology for providing an additional service while connecting an originated or terminated communication call. More particularly, the present invention relates to a system and method for providing a screen switching service during call counseling and a device applied thereto, which not only provide a counsel data screen to a terminal device of a customer according to a request from a counselor but also enable the counselor to control the counsel data screen being displayed in the terminal device of the customer, when the customer is communicating with a counselor by sending a call to a customer center or receiving a call from the counselor of the customer center.

BACKGROUND ART

In general, mobile communication systems are undergoing rapid progress and spread with the recent development in the communication technologies and the improvement in the economic level.

Mobile communication systems have developed from the initial analog scheme through the recently universalized digital-based schemes of TDMA (Time Division Multiple Access) and CDMA (Code Division Multiple Access) into such technologies capable of transmitting and receiving dynamic image data.

Further, with the development of wireless Internet technology, such as WAP (Wireless Application Protocol), mobile communication terminal devices are equipped with a web browser function, which has enabled the mobile communication terminal devices to evolve into means for acquiring information beyond simple communication means.

Such a development of mobile communication systems has enabled development of a method capable of providing a service user with pre-appointed data, instead of a ringer sound, during a standby period for a call termination response to a call establishment request from the service user.

As methods for outputting pre-appointed data through a mobile communication terminal device of a service user during a communication standby period, a melody pre-appointed by the service user may be output through the mobile communication terminal device of the service user or pre-appointed commercials, data, breaking news, etc. may be output through the mobile communication terminal device of the service user.

In the conventional mobile communication systems, when a customer sends or receives a call to or from a counselor of a customer center, counseling is performed through a simple voice communication or image communication between the customer and the counselor.

However, only oral explanation by the counselor on the information desired by the customer may increase the counseling time. Such an increase in the counseling time may increase the inconvenience of the customers and the labor cost of counselors.

Therefore, there has been a necessity for a solution to solve the above problem.

DISCLOSURE

Technical Problem

Therefore, embodiments of the present invention have been made in view of the above-mentioned problems, and an aspect of the present invention is to provide a system and method for providing a screen switching service during call counseling and a device applied thereto, which provide a counsel data screen for counseling to a terminal device of a customer according to a request from a counselor when the customer is communicating with a counselor by sending a call to a customer center or receiving a call from the counselor of the customer center.

Technical Solution

In accordance with a first aspect of the present invention, there is provided a system for providing a screen switching service during call counseling, including: a user terminal unit for establishing a communication call; a counselor terminal unit for making a request for switching of a terminal screen of the user terminal unit into a counsel data screen for counseling by originating or terminating the communication call; a screen switching service unit for making a control to generate a data call for the user terminal unit and then transfer the counsel data screen through the data call to the user terminal unit, in response to the request during the communication call; and a content providing unit for providing the counsel data screen.

It is preferred that the counselor terminal unit provides access route information for the counsel data screen and a telephone number of the user terminal unit to the screen switching service unit while making the request.

In accordance with a second aspect of the present invention, there is provided a screen switching service providing server in a system for providing a screen switching service during call counseling, the screen switching service providing server including: a service request receiving unit for receiving a request for provision of a screen switching service for switching a terminal screen of a user terminal device into a counsel data screen for counseling from a counselor terminal device which is in a communication call with the user terminal device; a screen switching setting unit for generating a data call for the user terminal device and forming screen switching control information including an access route for providing the counsel data screen through the data call, in response to the request during the communication call; and a transmitting unit for transferring the screen switching control information to the user terminal device.

In accordance with a third aspect of the present invention, there is provided a method for providing a screen switching service during call counseling, including: a service request receiving step of receiving a request for provision of a screen switching service for a terminal screen of a user terminal device into a counsel data screen for counseling from a counselor terminal device which in a communication call with the user terminal device; a service information forming step of forming screen switching control information including an access route of the counsel data screen; an information transmitting step of transmitting the screen switching control information to the user terminal device; a data call connection step of generating a data call of the user terminal device based on the screen switching control information during the communication call; and a screen switching step of switching the terminal screen into the counsel data screen by transferring the counsel data screen to the user terminal device through the data call.

In accordance with a fourth aspect of the present invention, there is provided a system for providing a screen switching service during call counseling, including: a user terminal unit for establishing a communication call; a counselor terminal unit for making a request for switching of a terminal screen of the user terminal unit into a counsel data screen for counseling by originating or terminating the communication call; a screen switching service unit for making a control to generate a first data call for the user terminal unit and then transfer the counsel data screen through the first data call to the user terminal unit and transfer the counsel data screen to the counselor terminal unit through a second data call formed due to the request, in response to the request during the communication call; and a content providing unit for providing the counsel data screen, wherein the screen switching service unit makes a page control for the counsel data screen being displayed in the user terminal device in response to a control input of the counselor terminal device through the second data call.

It is preferred that the counselor terminal unit provides access route information for the counsel data screen and a telephone number of the user terminal unit to the screen switching service unit while making the request.

In accordance with a fifth aspect of the present invention, there is provided a screen switching service providing server in a system for providing a screen switching service during call counseling, the screen switching service providing server including: a service request receiving unit for receiving a request for provision of a screen switching service for switching a terminal screen of a user terminal device into a counsel data screen for counseling from a counselor terminal device which is in a communication call with the user terminal device; a screen switching setting unit for generating a first data call for the user terminal device and forming first screen switching control information including an access route for providing the counsel data screen through the first data call, and forming second screen switching control information including an access route for providing the counsel data screen through a second data call formed due to the request, in response to the request during the communication call; and a transmitting unit for transferring the first screen switching control information to the user terminal device and the second screen switching control information to the counselor terminal device.

It is preferred that the screen switching setting unit changes the first screen switching control information and the second screen switching control information in response to a control input of the counselor terminal device through the second data call.

It is preferred that the user terminal device changes a page of the counsel data screen according to a change of the first screen switching control information.

In accordance with a sixth aspect of the present invention, there is provided a method for providing a screen switching service during call counseling, including: a service request receiving step of receiving a request for provision of a screen switching service for a terminal screen of a user terminal device into a counsel data screen for counseling from a counselor terminal device which in a communication call with the user terminal device; a service information forming step of forming first screen switching control information including an access route of the counsel data screen correspond to the user terminal device and second screen switching control information including an access route of the counsel data screen correspond to the counselor terminal device; an information transmitting step of transmitting the first screen switching control information to the user terminal device and the second screen switching control information to the counselor terminal device; a first data call connection step of generating a first data call of the user terminal device based on the first screen switching control information during the communication call; and a screen switching step of transferring the counsel data screen to the user terminal device through the first data call and transferring the counsel data screen to the counselor terminal device through a second data call formed due to the request.

It is preferred that the method for providing a screen switching service during call counseling may further include a screen control step of making a page control for the counsel data screen being displayed in the user terminal device in response to a control input of the counselor terminal device through the second data call.

Advantageous Effects

In a system and method for providing a screen switching service during call counseling and a device applied thereto according to embodiments of the present invention, when a customer is communicating with a counselor by sending a call to a customer center or receiving a call from the counselor of the customer center, not only is a counsel data screen provided to a terminal device of a customer according to a request from a counselor, but the counselor also can control the counsel data screen being displayed in the terminal device of the customer. Therefore, by the present invention, the customer and the counselor can make a more smooth communication, which can achieve an activation of the communication-based counseling service.

BRIEF DESCRIPTION OF THE DRAWINGS

The foregoing and other objects, features and advantages of the present invention will become more apparent from the following detailed description when taken in conjunction with the accompanying drawings in which.

BEST MODE

Mode for Invention

Hereinafter, embodiments of the present invention will be described in detail with reference to the accompanying drawings.

Figure 1:
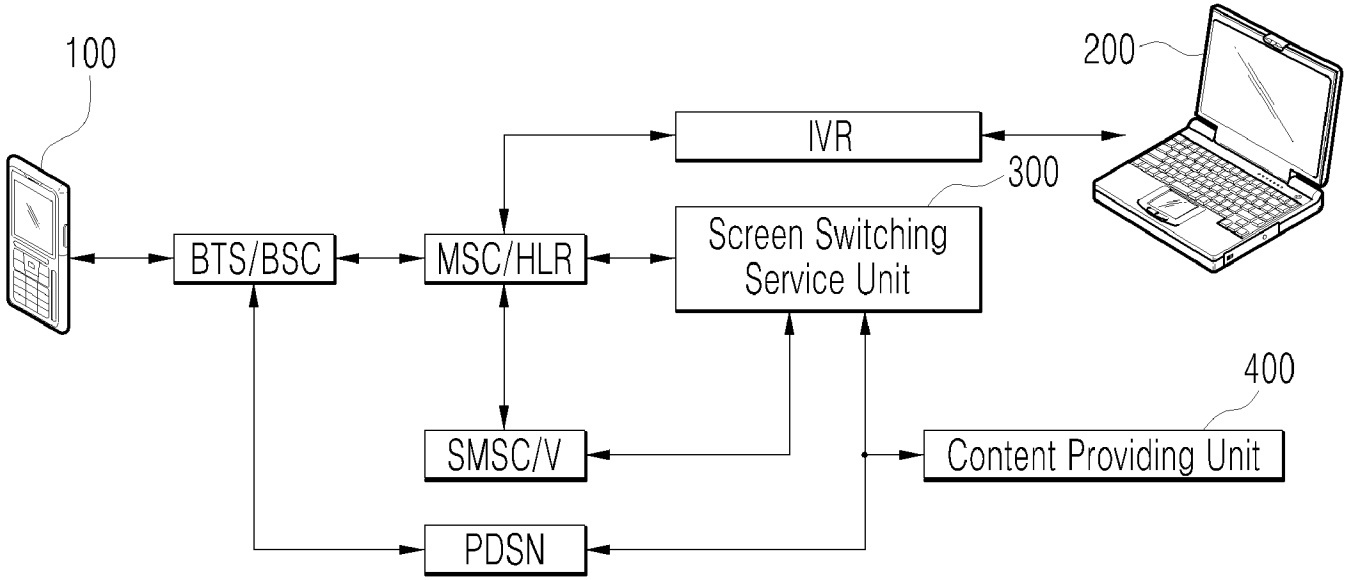
FIG. 1 illustrates a construction of a system for providing a screen switching service during call counseling according to an embodiment of the present invention.

FIG. 1 illustrates a construction of a system for providing a screen switching service during call counseling according to an embodiment of the present invention. As shown in FIG. 1 as a simple example, the system for providing a screen switching service during call counseling includes: a user terminal unit 100 for establishing a communication call by call origination or call termination; a counselor terminal unit 200 for establishing a communication call with the user terminal unit 100 and making a request for a screen switching service for switching a terminal screen of the user terminal unit 100 into a counsel data screen used for counseling; a screen switching service unit 300 for making a control to generate a data call for the user terminal unit 100 and then transfer a corresponding counsel data screen through the generated data call, in response to a request for a screen switching service from the counselor terminal unit 200 during a communication call between a customer and a counselor; and a content providing unit 400 for providing a counsel data screen.

It is preferred that the counselor terminal unit 200 provides access route information for the counsel data screen and a telephone number of the user terminal unit 100 while making a request for a screen switching service to the screen switching service unit 300.

Figure 2:
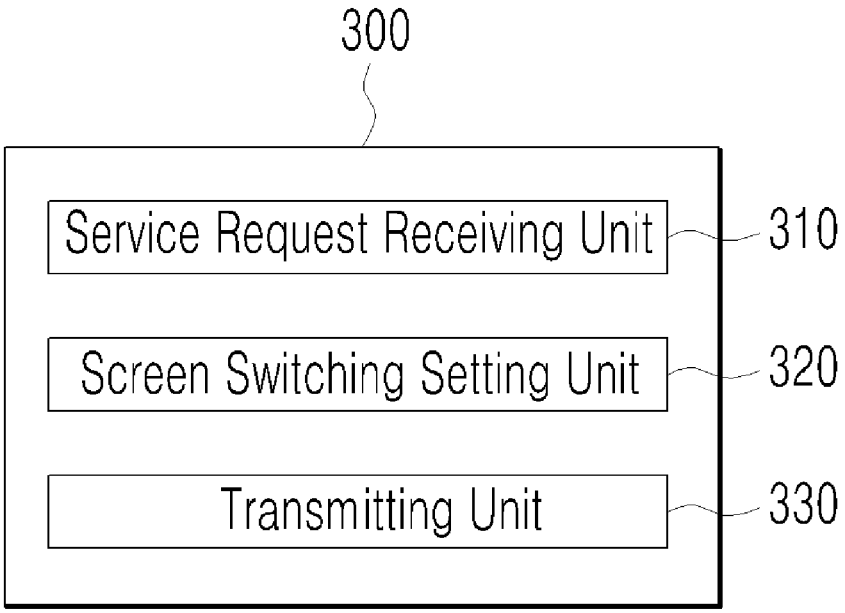
FIG. 2 illustrates a construction of the screen switching service unit 300 shown in FIG. 1.

FIG. 2 illustrates a construction of the screen switching service unit 300 shown in FIG. 1. As shown in FIG. 2 as an example, the screen switching service unit 300 includes: a service request receiving unit 310 for receiving a request for provision of a screen switching service for switching a terminal screen of the user terminal unit 100 into a counsel data screen for counseling from the counselor terminal unit 200 which is in a communication call with the user terminal unit 100; a screen switching setting unit 320 for generating a data call for the user terminal unit 100 and forming screen switching control information including an access route for providing a corresponding counsel data screen through the generated data call, in response to a request for provision of a screen switching service during a communication call; and a transmitting unit 330 for transferring screen switching control information to the user terminal unit 100.

As used herein, the screen switching control information is information generated in response to a request for provision of a screen switching service and may be generated in various forms.

First, in one of the various forms, the screen switching control information may have a function for making a request for operation of an application having been already stored in the user terminal unit 100, wherein the application may be a Virtual Machine (VM) application.

In this event, the user terminal unit 100 makes a direct access to the content providing unit 400 providing a corresponding counsel data screen based on Uniform Resource Locator (URL) information included in the screen switching control information by operating a corresponding application or makes an redirection access to the content providing unit 400 through the screen switching service unit 300.

Figure 3:
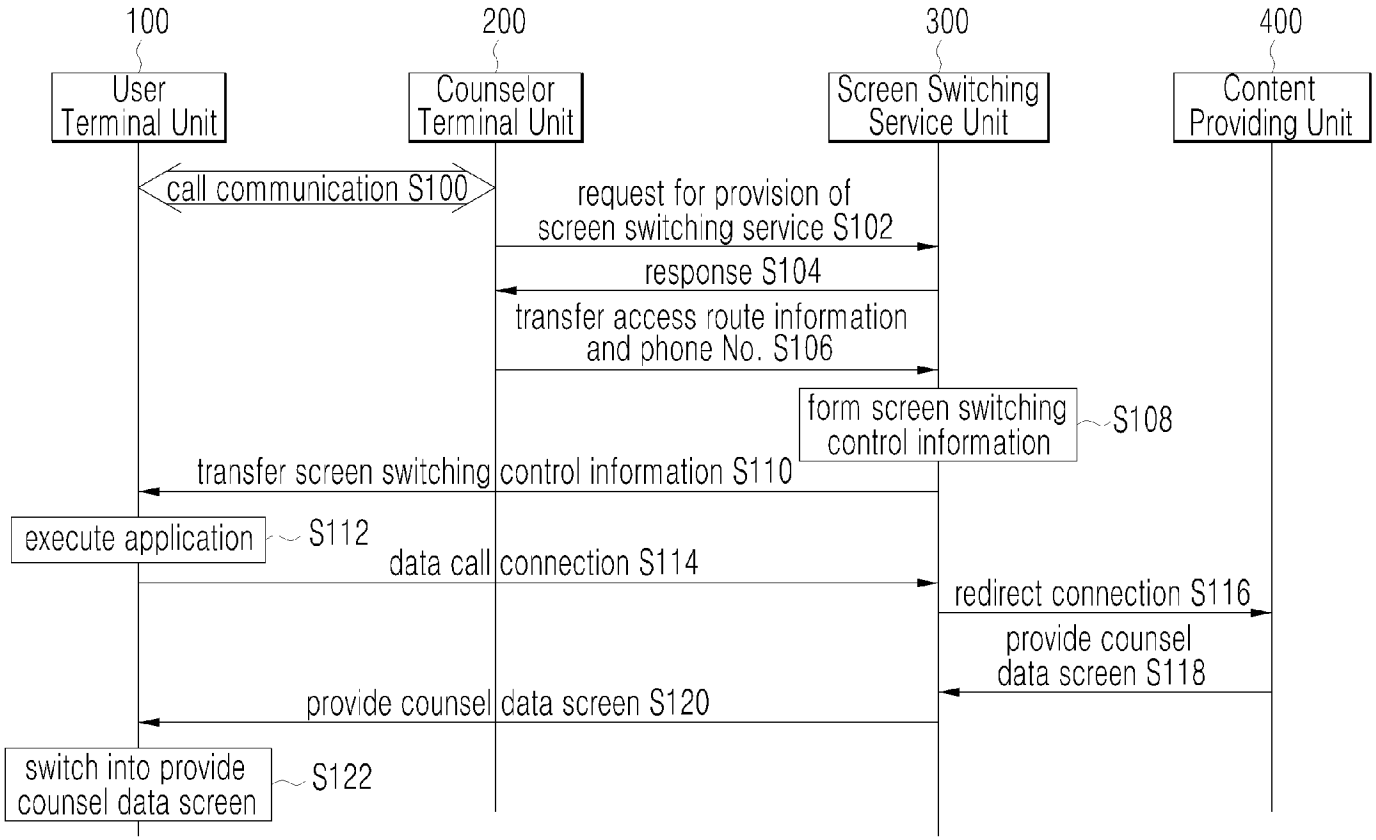
FIG. 3 is a flowchart illustrating an operation process of the system for providing a screen switching service during call counseling shown in FIG. 1.

FIG. 3 is a flowchart illustrating an operation process of the system for providing a screen switching service during call counseling shown in FIG. 1. As shown in FIG. 3 as only an example, the operation process of the system for providing a screen switching service during call counseling is started by execution of a communication call between the user terminal unit 100 corresponding to a customer's terminal and the counselor terminal unit 200 of a customer center (step S100).

Thereafter, the counselor terminal unit 200 requests the screen switching service unit 300 to provide a screen switching service while providing the screen switching service unit 300 with access route information for the counsel data screen and a telephone number of the user terminal unit 100 (steps S102 to S106).

Then, based on the provided information, the screen switching service unit 300 generates screen switching control information and transfers the generated screen switching control information to the user terminal unit 100 (steps S108 and S110).

The user terminal unit 100 executes a stored application based on the provided screen switching control information and then accesses the screen switching service unit 300 through a data call based on the URL information included in the screen switching control information (step S112 and S114).

Then, in response to the access request of the user terminal unit 100, the screen switching service unit 300 reads the URL information for the content providing unit 400 and then connects the user terminal unit 100 to the content providing unit 400 through redirection based on the read URL information (step S116).

The content providing unit 400 provides a counsel data screen to the screen switching service unit 300, and the screen switching service unit 300 transfers the provided counsel data screen to the user terminal unit 100 (steps S118 and S120).

As described above, the screen switching control information may be configured to execute the application of the user terminal unit 100.

Of course, the user terminal unit 100 not only may access the content providing unit 400 through the screen switching service unit 300 by way of redirection, but may also directly access the content providing unit 400.

Thereafter, the user terminal unit 100 displays the provided counsel data screen on the terminal screen, so as to enable a customer to identify the counsel data screen used for the counseling during the communication call, so that the customer can use a more efficient counseling service.

Figure 4:
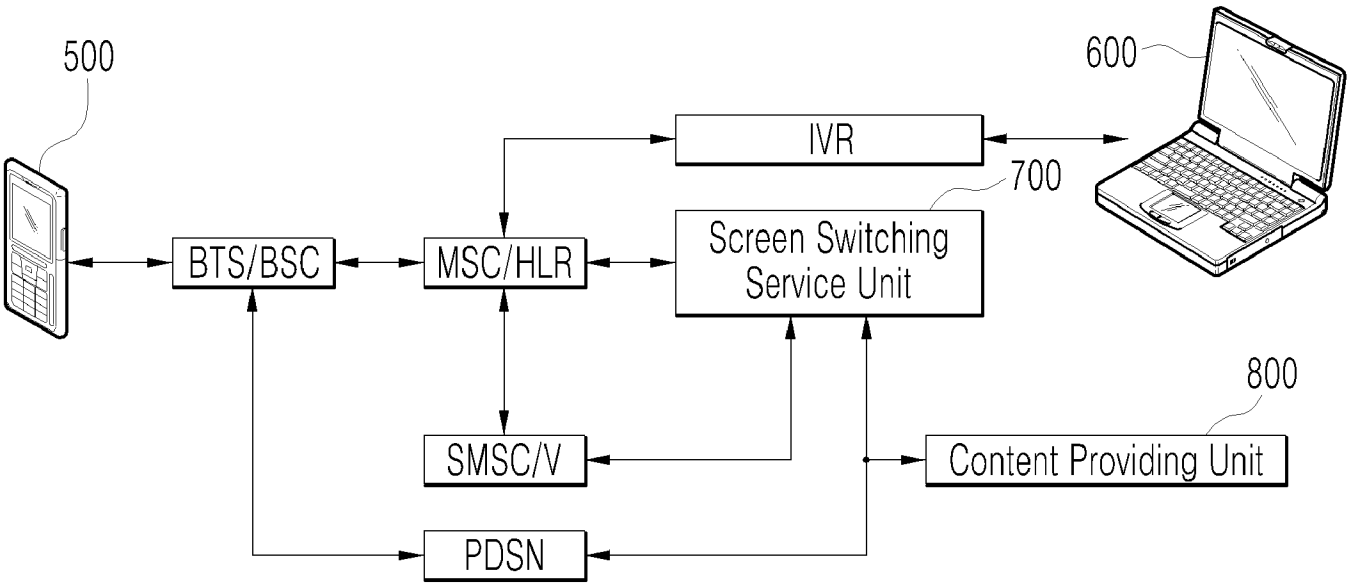
FIG. 4 illustrates a construction of a system for providing a screen switching service during call counseling according to another embodiment of the present invention.

FIG. 4 illustrates a construction of a system for providing a screen switching service during call counseling according to another embodiment of the present invention. As shown in FIG. 4 as a simple example, the system for providing a screen switching service during call counseling includes: a user terminal unit 500 for establishing a communication call by call origination or call termination; a counselor terminal unit 600 for establishing a communication call with the user terminal unit 500 and making a request for a screen switching service for switching a terminal screen of the user terminal unit 500 into a counsel data screen used for counseling; a screen switching service unit 700 for making a control to generate a first data call for the user terminal unit 500 and then transfer a corresponding counsel data screen to the user terminal unit 500 through the generated first data call in response to a request for a screen switching service from the counselor terminal unit 600 during a communication call between a customer and a counselor and to transfer the counsel data screen to the counselor terminal unit 600 through a second data call generated in response to the request for the screen switching service from the counselor terminal unit 600; and a content providing unit 800 for providing a counsel data screen.

The screen switching service unit 700 may make a page control for the counsel data screen being displayed on the user terminal unit 500 in response to a control input of the counselor terminal unit 600 through the second data call.

Further, it is preferred that the counselor terminal unit 600 provides access route information for the counsel data screen and a telephone number of the user terminal unit 500 while making a request for a screen switching service to the screen switching service unit 700.

Figure 5:
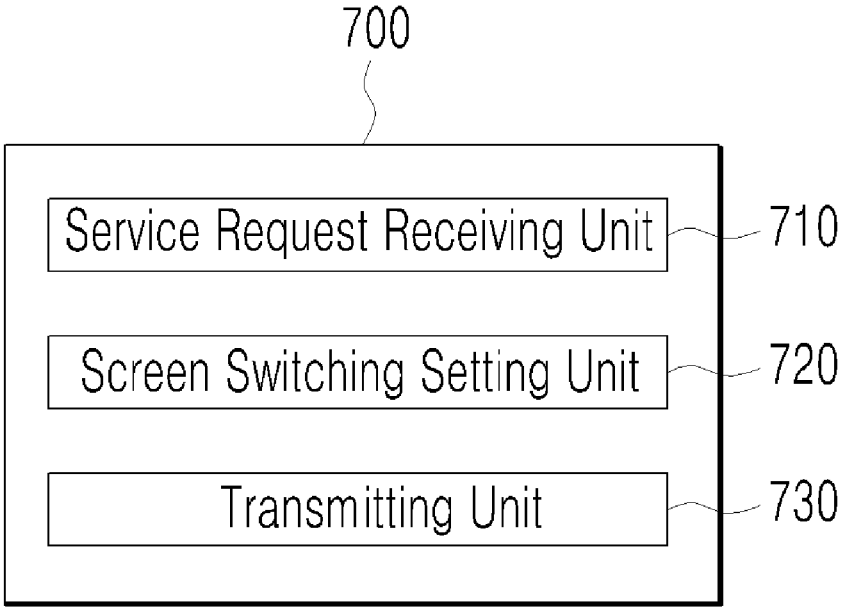
FIG. 5 illustrates a construction of the screen switching service unit 700 shown in FIG. 4.

FIG. 5 illustrates a construction of the screen switching service unit 700 shown in FIG. 4. As shown in FIG. 5 as a simple example, the screen switching service unit 700 includes: a service request receiving unit 710 for receiving a request for provision of a screen switching service for switching a terminal screen of the user terminal unit 500 into a counsel data screen for counseling from the counselor terminal unit 600 which is in a communication call with the user terminal unit 500; a screen switching setting unit 720 for generating a first data call for the user terminal unit 500 and forming first screen switching control information including an access route for providing a corresponding counsel data screen through the generated first data call in response to a request for provision of a screen switching service during a communication call, and forming second screen switching control information including an access route for providing a corresponding counsel data screen through a second data call generated in response to the request for provision of the screen switching service; and a transmitting unit 730 for transferring the first screen switching control information to the user terminal unit 500 and transferring the second screen switching control information to the counselor terminal unit 600.

Further, the screen switching setting unit 720 changes the first screen switching control information and second screen switching control information already formed in response to a control input of the counselor terminal unit 600 through the second data call for the counsel data screen.

Then, the user terminal unit 500 changes the page of the counsel data screen being displayed on the terminal screen according to the changed first screen switching control information.

Likewise, the counselor terminal unit 600 also changes the page of the counsel data screen according to the changed second screen switching control information.

As in the embodiment described above, the first screen switching control information and the second screen switching control information may be generated in various forms, such as a form for operating an application.

Figure 6:
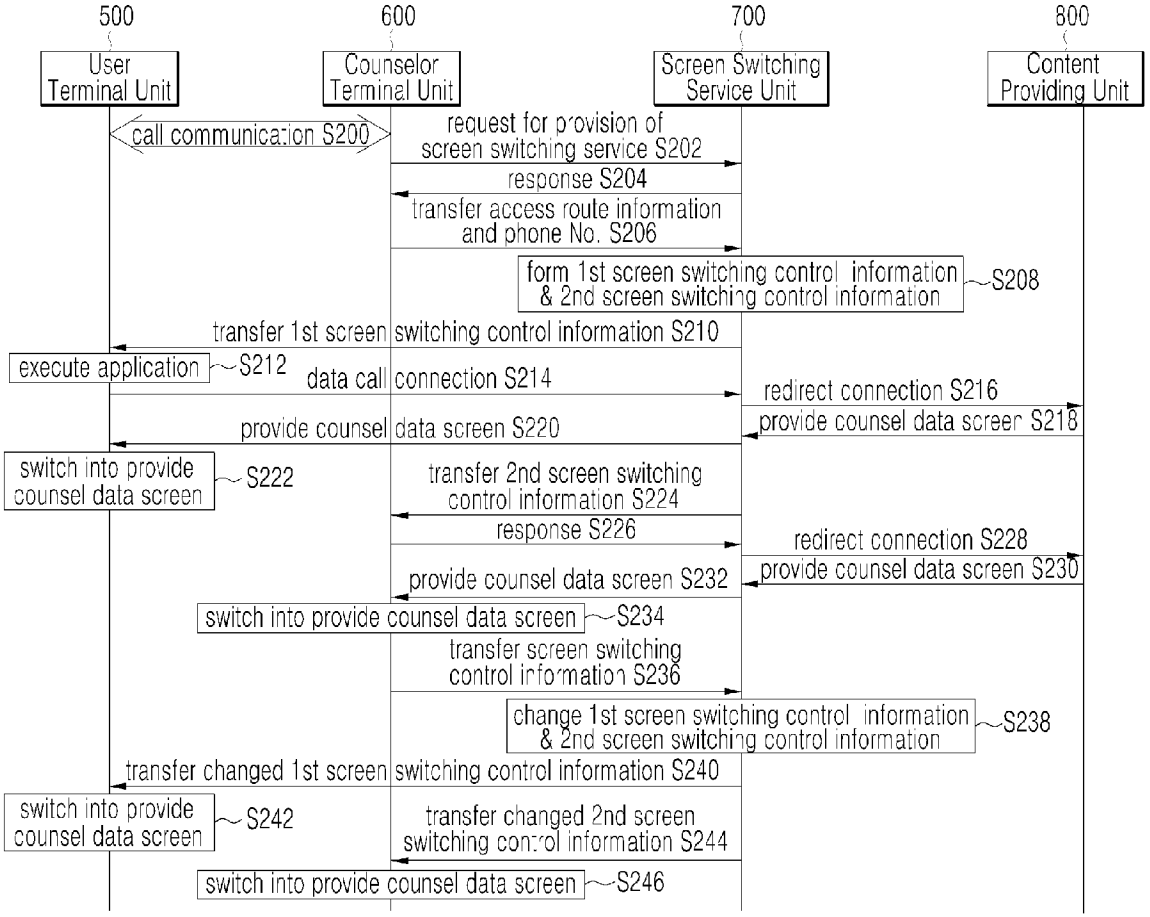
FIG. 6 is a flowchart illustrating an operation process of the system for providing a screen switching service during call counseling shown in FIG. 4.

FIG. 6 is a flowchart illustrating an operation process of the system for providing a screen switching service during call counseling shown in FIG. 4. As shown in FIG. 6 as only an example, the operation process of the system for providing a screen switching service during call counseling is started by execution of a communication call between the user terminal unit 500 corresponding to a customer's terminal and the counselor terminal unit 600 of a customer center (step S200).

Thereafter, the counselor terminal unit 600 requests the screen switching service unit 700 to provide a screen switching service while providing the screen switching service unit 700 with access route information for the counsel data screen and a telephone number of the user terminal unit 500 (steps S202 to S206).

Then, based on the provided information, the screen switching service unit 700 generates first screen switching control information to be transferred to the user terminal unit 500 and second screen switching control information to be transferred to the counselor terminal unit 600 (step S208).

Thereafter, the user terminal unit 500 executes a stored application based on the provided first screen switching control information and then accesses the screen switching service unit 700 through a first data call based on the URL information included in the first screen switching control information (step S210 to S214).

Then, in response to the access request from the user terminal unit 500, the screen switching service unit 700 reads the URL information for the content providing unit 800 and then connects the user terminal unit 500 to the content providing unit 800 through redirection based on the read URL information (step S216).

The content providing unit 800 provides a counsel data screen to the screen switching service unit 700, and the screen switching service unit 700 transfers the provided counsel data screen to the user terminal unit 500 (steps S218 and S220).

As described above, the screen switching control information may be configured to execute the application of the user terminal unit 500.

Of course, the user terminal unit 500 not only may access the content providing unit 800 through the screen switching service unit 700 by way of redirection, but may also directly access the content providing unit 800.

Thereafter, the user terminal unit 500 displays the provided counsel data screen on the terminal screen (step S222).

As in the case where the screen switching service unit 700 transfers the first screen switching control information to the user terminal unit 500, after transferring the second screen switching control information through the already formed second data call to the counselor terminal unit 600 also, the screen switching service unit 700 requests the content providing unit 800 to provide a corresponding counsel data screen, upon receiving a response to the second screen switching control information (steps S224 to S228).

Then, the content providing unit 800 provides a corresponding counsel data screen to the screen switching service unit 700 and the screen switching service unit 700 transfers the provided counsel data screen to the counselor terminal unit 600 (steps S230 and S232).

The counselor terminal unit 600 displays the provided counsel data screen on the terminal screen and then transfers screen control information formed by a page control relating to the counseling of the counselor with respect to the counsel data screen to the screen switching service unit 700 (steps S234 and S236).

The screen switching service unit 700 changes the first screen switching control information and second screen switching control information already formed through the provided screen control information and then transfers them to the user terminal unit 500 and the counselor terminal unit 600, respectively, and the counsel data screens being displayed on the user terminal unit 500 and the counselor terminal unit 600 are then changed, respectively (steps S238 to S246).

Although the present invention has been described above in connection with features, such as specific components of the present invention, several embodiments and drawings, these were provided merely to help a thorough understanding of the present invention but not intended to limit the present invention to the embodiments. A person ordinarily skilled in the art to which the present invention pertains can variously modify and change the specific features on the basis of the above disclosure.

The invention claimed is:

[1. A method for providing a screen switching service during call counseling, comprising:

a service request receiving step of receiving a request for provision of a screen switching service for a terminal screen of a user terminal device into a counsel data screen for counseling from a counselor terminal device which is in a communication call with the user terminal device;

a service information forming step of forming screen switching control information including an access route of the counsel data screen;

an information transmitting step of transmitting the screen switching control information to the user terminal device;

a data call connection step of generating a data call of the user terminal device based on the screen switching control information during the communication call; and a screen switching step of switching the terminal screen into the counsel data screen by transferring the counsel data screen to the user terminal device through the data call.]

2. A system for providing a screen switching service during call counseling, comprising:

a user terminal unit for establishing a communication call;

a counselor terminal unit for making a request for switching of a terminal screen of the user terminal unit into a counsel data screen for counseling by originating or terminating the communication call;

a screen switching service unit for making a control to generate a data call for the user terminal unit and then transfer the counsel data screen through the data call to the user terminal unit, in response to the request during the communication call; and a content providing unit for providing the counsel data screen.

3. The system for providing a screen switching service during call counseling as claimed in claim 2, wherein the counselor terminal unit [provides] *is configured to provide* access route information for the counsel data screen and a telephone number of the user terminal unit to the screen switching service unit while making the request.

[4. A screen switching service providing server in a system for providing a screen switching service during call counseling, the screen switching service providing server comprising:

a service request receiving unit for receiving a request for provision of a screen switching service for switching a terminal screen of a user terminal device into a counsel data screen for counseling from a counselor terminal device which is in a communication call with the user terminal device;

a screen switching setting unit for generating a data call for the user terminal device and forming screen switching control information including an access route for providing the counsel data screen through the data call, in response to the request during the communication call; and a transmitting unit for transferring the screen switching control information to the user terminal device.]

[5. The screen switching service providing server as claimed in claim 4, wherein the screen switching control information makes a request for operation of an application which has been already stored in the user terminal device and corresponds to the screen switching service.]

[6. The screen switching service providing server as claimed in claim 5, wherein the user terminal device makes a direct access to a content providing server providing the counsel data screen based on Uniform Resource Locator (URL) information included in the screen switching control information by operating the application or makes an redirection access to the content providing server through the screen switching setting unit.]

[7. A method for providing a screen switching service during call counseling, comprising:

a service request receiving step of receiving a request for provision of a screen switching service for a terminal screen of a user terminal device into a counsel data screen for counseling from a counselor terminal device which is in a communication call with the user terminal device;

a service information forming step of forming first screen switching control information including an access route of the counsel data screen correspond to the user terminal device and second screen switching control information including an access route of the counsel data screen correspond to the counselor terminal device;

an information transmitting step of transmitting the first screen switching control information to the user terminal device and the second screen switching control information to the counselor terminal device;

a first data call connection step of generating a first data call of the user terminal device based on the first screen switching control information during the communication call; and a screen switching step of transferring the counsel data screen to the user terminal device through the first data call and transferring the counsel data screen to the counselor terminal device through a second data call formed due to the request.]

[8. A method for providing a screen switching service during call counseling as claimed in claim 7, further comprising:

a screen control step of making a page control for the counsel data screen being displayed in the user terminal device in response to a control input of the counselor terminal device through the second data call.]

9. A system for providing a screen switching service during call counseling, comprising:

a user terminal unit for establishing a communication call;

a counselor terminal unit for making a request for switching of a terminal screen of the user terminal unit into a counsel data screen for counseling by originating or terminating the communication call;

a screen switching service unit for making a control to generate a first data call for the user terminal unit and then transfer the counsel data screen through the first data call to the user terminal unit and transfer the counsel data screen to the counselor terminal unit through a second data call formed due to the request, in response to the request during the communication call; and a content providing unit for providing the counsel data screen, wherein the screen switching service unit [makes] *is configured to make* a page control for the counsel data screen being displayed in the user terminal [device] *unit* in response to a control input of the counselor terminal [device] *unit* through the second data call.

10. The system for providing a screen switching service during call counseling as claimed in claim 9, wherein the counselor terminal unit [provides] *is configured to provide* access route information for the counsel data screen and a telephone number of the user terminal unit to the screen switching service unit while making the request.

[11. A screen switching service providing server in a system for providing a screen switching service during call counseling, the screen switching service providing server comprising:

a service request receiving unit for receiving a request for provision of a screen switching service for switching a terminal screen of a user terminal device into a counsel data screen for counseling from a counselor terminal device which is in a communication call with the user terminal device;

a screen switching setting unit for generating a first data call for the user terminal device and forming first screen switching control information including an access route for providing the counsel data screen through the first data call, and forming second screen switching control information including an access route for providing the counsel data screen through a second data call formed due to the request, in response to the request during the communication call; and a transmitting unit for transferring the first screen switching control information to the user terminal device and the second screen switching control information to the counselor terminal device.]

[12. The screen switching service providing server in a system for providing a screen switching service during call counseling as claimed in claim 11, wherein the screen switching setting unit changes the first screen switching control information and the second screen switching control information in response to a control input of the counselor terminal device through the second data call.]

[13. The screen switching service providing server in a system for providing a screen switching service during call counseling as claimed in claim 12, wherein the user terminal device changes a page of the counsel data screen according to a change of the first screen switching control information.]

*14. The system of claim 2, wherein the user terminal unit is configured to establish the communication call with the counselor terminal unit by making a call to or receiving a call from the counselor terminal unit.*

*15. The system of claim 2, wherein the counselor terminal unit and the screen switching service unit are connected to at least one communication network for communicating with each other.*

*16. The system of claim 2, wherein the user terminal unit comprises a mobile communication device that is configured to run an application based on a communication from the screen switching service unit.*

*17. The system of claim 2, wherein the counselor terminal unit is configured to provide a control input for controlling the counsel data screen being displayed on the user terminal unit during the communication call with the user terminal unit.*

*18. The system of claim 2, wherein the screen switching service unit is configured to control generating the data call for providing the counsel data screen to the user terminal unit.*

*19. The system of claim 2, wherein the screen switching service unit is configured to form screen switching control information and to transmit the screen switching control information to the user terminal unit for making the control to generate the data call and transfer the counsel data screen to the user terminal unit.*

*20. The system of claim 19, wherein the screen switching control information comprises a URL associated with the content providing unit that stores the counsel data screen.*

*21. The system of claim 19, wherein the screen switching service unit is configured to obtain an access route from its communication with the counselor terminal unit.*

*22. The system of claim 19, wherein the screen switching service unit is configured to receive information of the user terminal unit from the counselor terminal unit.*

*23. The screen switching service providing server of claim 22, wherein the information of the user terminal unit comprises a phone number of the user terminal unit.*

*24. The system of claim 19, wherein the screen switching service unit is configured to form the screen switching control information including a function to request for running an application stored in the user terminal unit.*

*25. The system of claim 19, wherein the screen switching service unit is configured to form the screen switching control information with a function to initiate an application in the user terminal unit and further with a URL for the counsel data screen.*

*26. The system of claim 19, wherein the screen switching control information from the screen switching service unit is configured to initiate an application in the user terminal unit for generate the data call and transferring the counsel data screen to the user terminal unit.*

*27. The system of claim 19, wherein the system is configured to control a transfer of the counsel data screen from the content providing unit to the user terminal unit.*

*28. The system of claim 27, wherein the system is configured to control the transfer of the counsel data screen such that the user terminal unit directly accesses the content providing unit.*

*29. The system of claim 27, wherein the screen switching service unit is configured to coordinate the transfer of the counsel data screen from the content providing unit to the user terminal unit by redirection using a URL associated with the content providing unit.*

*30. The system of claim 2, wherein the system is configured to make the data call during the communication call between the user terminal unit and the counselor terminal unit.*

*31. The system of claim 2, wherein the screen switching service unit is configured to control displaying of a page of the counsel data screen on the user terminal unit in response to a control input from the counselor terminal unit.*

*32. The system of claim 2, wherein the screen switching service unit is configured to control displaying of a page of the counsel data screen on the user terminal unit.*

*33. The system of claim 9, wherein the counselor terminal unit, the screen switching service unit are connected to at least one communication network for communicating with each other.*

*34. The system of claim 9, wherein the user terminal unit comprises a mobile communication device that is configured to run an application based on a communication from the screen switching service unit.*

*35. The system of claim 9, wherein the counselor terminal unit is configured to provide a control input for controlling the counsel data screen being displayed on the user terminal unit during the communication call with the user terminal unit.*

* * * * *